United States Patent [19]

Hodak

[11] Patent Number: 5,194,162

[45] Date of Patent: Mar. 16, 1993

[54] METHOD FOR TREATING SWIMMING POOL WATER

[76] Inventor: Frank J. Hodak, E. Cruikshank Rd., Valencia, Pa. 16059

[21] Appl. No.: 726,299

[22] Filed: Jul. 5, 1991

[51] Int. Cl.$^5$ ................................................. C02F 1/50
[52] U.S. Cl. .................................... 210/755; 210/764; 422/37
[58] Field of Search ............... 210/755, 764, 765, 756; 422/37

[56] References Cited

U.S. PATENT DOCUMENTS

| | | | |
|---|---|---|---|
| 3,488,420 | 1/1970 | Keast et al. | 210/755 |
| 4,389,318 | 6/1983 | Wojowicz | 210/755 |
| 4,411,799 | 10/1983 | Ito et al. | 210/764 |
| 5,021,186 | 6/1991 | Ota et al. | 210/755 |

*Primary Examiner*—Thomas Wyse
*Attorney, Agent, or Firm*—Webb Burden Ziesenheim & Webb

[57] ABSTRACT

A method for reducing an isocyanuric acid level concentration in swimming pool water to prevent chlorine lock. The method comprises the steps of adding an effective amount of sodium hydroxide to the pool water and reacting the sodium hydroxide with the isocyanuric acid therein to reduce the isocyanuric concentration to a level of between about 40 to 60 PPM.

7 Claims, No Drawings

METHOD FOR TREATING SWIMMING POOL WATER

BACKGROUND OF THE INVENTION

The present invention relates generally to water treatment and, more particularly, to the chemical treatment of swimming pool water. In order to keep swimming pool water clear and free of unwanted biological growth, measured amounts of chlorine are commonly added to the pool water at given intervals. One common method of making chlorine additions is to add chlorine in the form of dry, granular calcium hypochlorite on a daily basis in a measured dose of, for example, 3-4 ounces per 5,000 gallons of contained pool water. In order to make the task of adding chlorine easier for the pool owner, and to extend the life of the chlorine, it is common to add an isocyanurate stabilizer to the pool water to prevent the usual rapid dissipation of chlorine which is caused by ultraviolet light degradation to thus permit less frequent chlorine additions. Chlorine has also been formulated into a slow-acting tablet form, commonly referred to as stabilized concentrated chlorinating tablets, which conveniently allows chlorine additions on a weekly basis. While stabilized chlorinating tablets offer a significant convenience in the maintenance of pool water, they, likewise, possess an inherent shortcoming. Commonly used isocyanurate stabilizers form isocyanuric acid in the pool water, also known as fulminuric acid (2-cyano-2-nitroethanamide) represented by the chemical formula $CNCN(NO_2)CONH_2$.

It is observed that the isocyanuric acid concentration continues to increase in the pool water as additional isocyanurate stabilizers are added over a period of time. When the isocyanuric acid concentration in the pool water reaches a level of about 100 parts per million (PPM), a so-called "chlorine lock" occurs which renders further chlorine additions as ineffective. This condition is easily detected by way of a known pool water test wherein a conventional isocyanuric reagent turns progressively foggy within prescribed limits.

When such a chlorine lock occurs, it is common practice to drain the saturated pool water and replace it with fresh water. Of course, continued isocyanurate stabilizer additions eventually cause a similar chlorine lock to occur in the replaced water which requires yet another drain and replacement. Needless to say, this conventional practice of correcting the chlorine lock problem due to accumulated isocyanuric acid is not only inconvenient to the pool owner, requiring pool shut down, but also is expensive with respect to the high cost of replacement water which in a typical swimming pool may be on the order of about 30,000 gallons, for example.

SUMMARY OF THE INVENTION

My invention solves the problems heretofore encountered from the use of chlorinating tablets having isocyanurate stabilizers by providing a method comprising the addition of a dry mixture or a solution containing an effective amount of sodium hydroxide to the saturated swimming pool water to cause a reaction whereby the excess isocyanuric acid is reduced to a level of below 100 PPM and the chlorine lock condition is relieved. Preferably, the pool water is treated to yield a controlled isocyanuric acid concentration of between about 40-60 PPM.

DETAILED DESCRIPTION OF THE INVENTION

In order to treat swimming pool water which has accumulated isocyanuric acid therein as a result of repeated use of stabilized chlorinating tablets or other isocyanurate additions, the inventor contemplates the addition of an effective amount of sodium hydroxide (NaOH) to the pool water. The sodium hydroxide reacts with the isocyanuric acid in the pool water so as to reduce the concentration of isocyanuric acid to a level below 100 PPM and preferably to a concentration of between about 40-60 PPM. The sodium hydroxide may be added in dry form or as a prepared liquid solution.

By way of illustration, a preferred sodium hydroxide solution is prepared by mixing reagent grade or commercial grade sodium hydroxide with water to form an aqueous solution of between 5%-10% (by weight) of a sodium hydroxide. Preferably, one-half gallon of the 5% sodium hydroxide/water solution is used to treat 10,000 gallons of pool water containing in excess of 100 PPM of isocyanuric acid. Thus, in order to treat a typical pool, for example, containing 30,000 gallons of water, one and one-half gallons of the 5% sodium hydroxide solution is usually effective in reducing the excess isocyanuric acid to a preferred, controlled level of between about 40-60 PPM in the treated pool water. At that reduced concentration, the isocyanuric acid no longer causes the so-called chlorine lock and the conventional treatment methods utilizing stabilized chlorinating tablets or the like may be continued.

In addition, an effective amount of sodium hypochloride may be added to the sodium hydroxide solution, if desired, in order to enhance the performance thereof. The sodium hypochloride may be introduced in an amount of about 2% by weight, for example, in the previously described sodium hydroxide solution.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A method for treating swimming pool water containing an excess concentration of isocyanuric acid therein, the method comprising the steps of adding an effective amount of sodium hydroxide to the pool water and reacting the sodium hydroxide with the isocyanuric acid to thereby reduce the isocyanuric acid to a desired concentration.

2. The method of claim 1 wherein the sodium hydroxide is added to the pool water in the form of a solution of sodium hydroxide.

3. The method of claim 1 wherein the desired reduced concentration of isocyanuric acid is between about 40-60 PPM.

4. The method of claim 2 wherein the solution comprises between about 5%-10% by weight sodium hydroxide in water.

5. The method of claim 2 wherein the solution also contains an amount of sodium hypochlorite.

6. The method of claim 2 wherein the solution comprises about 5% by weight sodium hydroxide and about ½ gallon of said solution is added per 10,000 gallons of pool water to be treated.

7. A method for treating swimming pool water containing a concentration of isocyanuric acid in excess of 100 PPM, the method comprising the steps of adding an aqueous solution containing about 5% by weight sodium hydroxide to the pool water in an amount of about ½ gallon of said solution per 10,000 gallons of pool water;

reacting the sodium hydroxide with the isocyanuric acid; and reducing the isocyanuric acid in said pool water to a concentration of between about 40 to about 60 PPM.

* * * * *